United States Patent [19]
Sasaki et al.

[11] Patent Number: 5,782,153
[45] Date of Patent: Jul. 21, 1998

[54] DESK-TOP CIRCULAR SAW INCLUDING CHIP DISCHARGING MEANS

[75] Inventors: Katsuhiko Sasaki; Kiyotaka Ichikawa; Atsushi Yamada; Toshiyuki Kani, all of Anjo, Japan

[73] Assignee: Makita Corporation, Anjo, Japan

[21] Appl. No.: 657,944

[22] Filed: Jun. 4, 1996

[30]  Foreign Application Priority Data

Jun. 8, 1995 [JP] Japan .................................. 7-142076

[51] Int. Cl.⁶ ................................................. B23D 45/04
[52] U.S. Cl. ................................................ 83/162; 83/490
[58] Field of Search .......................... 83/165, 490, 100, 83/473, 471.3, 162

[56]  References Cited

U.S. PATENT DOCUMENTS

| | | | |
|---|---|---|---|
| 4,241,505 | 12/1980 | Bodycomb, Jr. et al. | 83/100 |
| 4,367,665 | 1/1983 | Terpstra et al. | 83/473 |
| 4,694,720 | 9/1987 | Brickner et al. | 83/471.3 |
| 4,974,907 | 12/1990 | Komura | 83/100 |
| 5,042,348 | 8/1991 | Brundage et al. | 83/490 |
| 5,063,802 | 11/1991 | Shiotani et al. | 83/98 |
| 5,084,972 | 2/1992 | Waugh | 83/100 |
| 5,437,214 | 8/1995 | Sasaki et al. | 83/473 |
| 5,445,056 | 8/1995 | Folci | 83/100 |

FOREIGN PATENT DOCUMENTS

| | | | |
|---|---|---|---|
| 407204 | 1/1991 | European Pat. Off. | 83/DIG. 1 |
| 133993 | 10/1980 | Italy. | |

*Primary Examiner*—Kenneth E. Peterson
*Attorney, Agent, or Firm*—Lahive & Cockfield, LLP

[57]  ABSTRACT

In a desk-top circular saw comprising a base, a turntable mounted on the base, an arm provided on the rear of the base, and a saw blade assembly pivotally attached to the upper end of the arm with a pivot shaft, a horizontal cylinder is provided in the arm between the pivot shaft and a blade tilting lever. The cylinder penetrates the arm to allow airflow therethrough. Provided in front of the cylinder is a flared member including a bottom plate sloping downward and a pair of side plates, thereby forming a U-like cross section. A chip guide comprising an upper plate and side plates forming an inverted U-like cross section is fastened to the underside of the neck of the saw blade assembly. The chip guide can vertically pivot integrally with the saw blade assembly. The flared member and the chip guide jointly form a chip guide passage for guiding chips into the cylinder for disposal.

13 Claims, 8 Drawing Sheets

DESK-TOP CIRCULAR SAW INCLUDING CHIP DISCHARGING MEANS

BACKGROUND OF THE INVENTION

Field of the Invention

The present invention relates to a desk-top circular saw. More particularly, the present invention pertains to a desk-top circular saw that comprises an arm provided on the rear of a table on which work is placed, and a circular saw blade vertically pivotally attached to the arm.

2. Description of the Prior Art

Various means for guiding and discharging chips have been proposed for use in such a desk-top circular saw as described above. One such example is disclosed in JAPANESE PATENT LAYING-OPEN GAZETTE No. H6-210605, in which the housing, the saw support arm, and the table of a desk-top circular saw are provided with respective chip removal passages. These passages are connected to respective flexible hoses that are joined together further downstream into a common hose attached to a dust collector or a dust-bag. Also, JAPANESE UTILITY MODEL LAYING-OPEN GAZETTE No. H3-70902 discloses a chip removal arrangement in which a wall provided at the rear of the table and the saw assembly housing jointly form a chip guiding passage when the saw blade is lowered for cutting so that the airflow caused by the rotation of the saw blade can blow chips upward into a chip outlet provided in the upper portion of the saw assembly housing.

The former arrangement, requiring the three branch hoses, makes the entire apparatus structurally complicated. In addition, the positions of the hoses change as the saw blade assembly pivots or as the entrances of the chip removal passages move. This causes pressure differences among the hoses, resulting in difference in chip collecting efficiency among the chip removal passages. Furthermore, the operation of the apparatus may be hampered by the flexible hoses connected to the three chip removal passages.

In the latter arrangement, since chips scattered in a generally horizontal direction and a slightly upward direction have to be blown upward along the chip guiding passage into the chip outlet, some chips bounce off the wall or the housing scattering about the area, instead of entering the chip outlet. Therefore, this type of arrangement leaves much to be desired in chip collecting efficiency. In addition, scattering chips often obstruct the view of the mark-off lines drawn on the work piece being cut.

SUMMARY OF THE INVENTION

In view of the above disadvantages of the known desk-top circular saws, an object of the present invention is to provide a desk-top circular saw having a simply structured chip removal means with a superior chip collecting efficiency, without sacrificing the workability and the operating efficiency.

The above and other related objects are realized by providing in a blade support arm a chip discharge means with an opening formed in the front of the blade support arm. The chip discharge means may be a cylinder penetrating the arm generally in the chip traveling direction. Preferably, the opening formed in the front of the blade support arm is flared for effectively catching chips. Moreover, a guide member is preferably provided on the lower part of a saw blade assembly in such a way as to be able to vertically pivot together with the saw blade assembly.

With the chip discharge means opening in the front of the arm, this arrangement can effectively catch chips traveling horizontally and discharge them behind the arm. If the chip discharge means comprises a cylindrical member, a dust-bag or the hose of a dust collector can be readily connected to it for easier chip disposal. If the chip collecting means includes a flared portion in the front, the effective area of the opening will be enlarged, thereby improving the chip collecting efficiency. Moreover, if a chip guide member is provided at the bottom of the saw blade assembly, chips traveling upward when a thick work piece is cut can be more easily directed into the opening.

DETAILED DESCRIPTION OF THE PREFERRED EMBODIMENTS

The present invention will be more particularly described with reference to the accompanying drawings.

Embodiment 1

Figure 1:
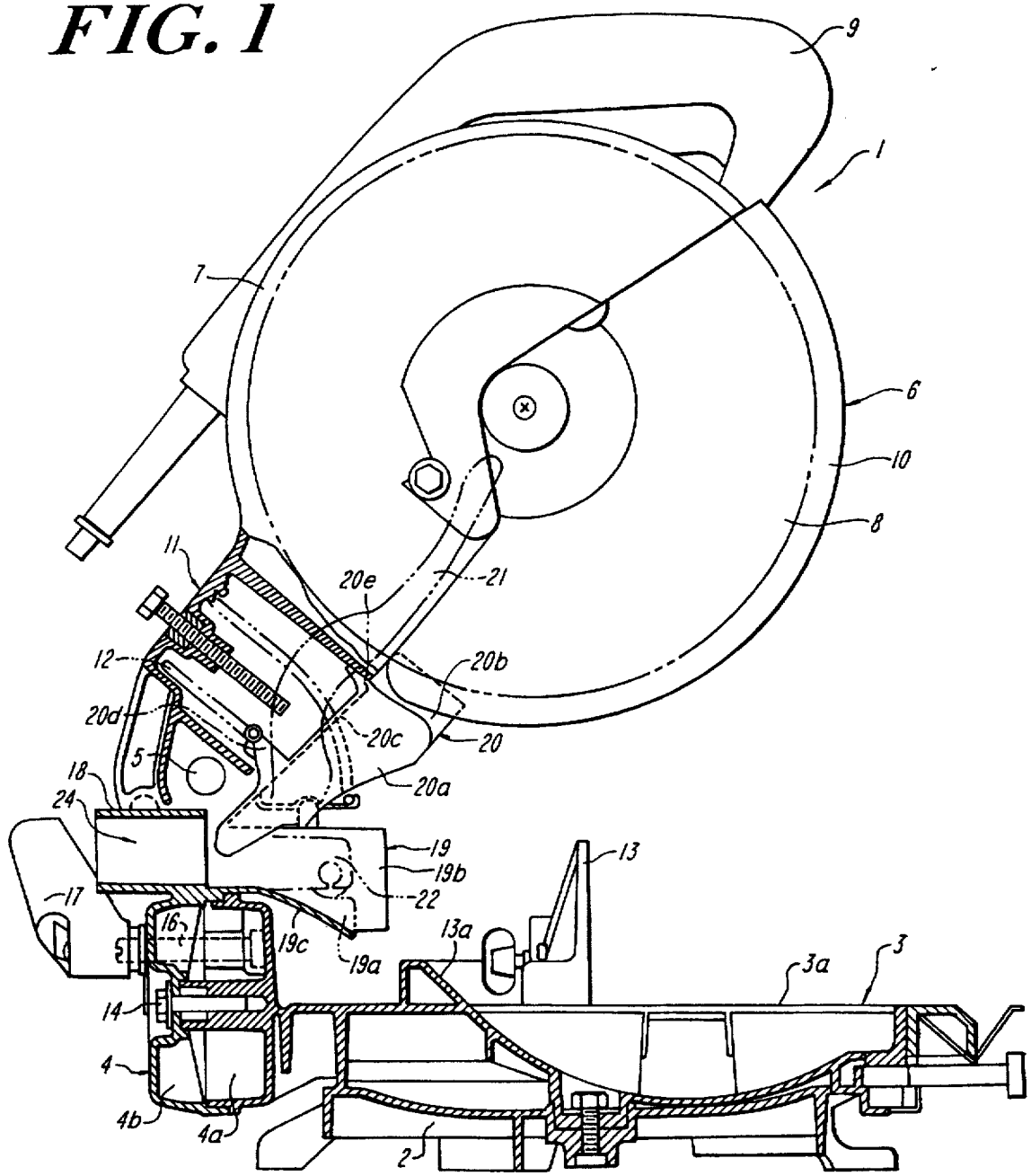
FIG. 1 is a partially cross sectioned side view of a desk-top circular saw of a first embodiment in accordance with the present invention.

Referring to FIG. 1, reference numeral 1 generally designates a desk-top circular saw of a first embodiment in accordance with the present invention. The circular saw includes a base 2, a turntable 3 mounted on the base 2, and an arm 4 provided upright on the rear of the turntable 3 (The right side of FIG. 1 is referred to as the front and the left side the rear hereinafter). A saw blade assembly 6 is vertically pivotally attached to the top end of the arm 4 with a pivot shaft 5. The saw blade assembly 6 includes a motor (not shown) for rotating a circular saw blade 8, a blade case 7 covering the upper portion of the saw blade 8, a handle 9, a blade guard 10. The saw blade assembly 6 is normally urged upward by a compression spring 12 provided at the neck 11 of the blade case 7. A guide wall 13 is provided on the top surface of the turntable 3 at right angles to a pair of blade slot plates 3a. Provided at the center of the guide wall 13 is a curved portion 13a formed to horizontally circumvent the blade slot plates 3a. The curved portion 13a extends above the turntable 3 in the rear direction forming a slope.

Figure 2:
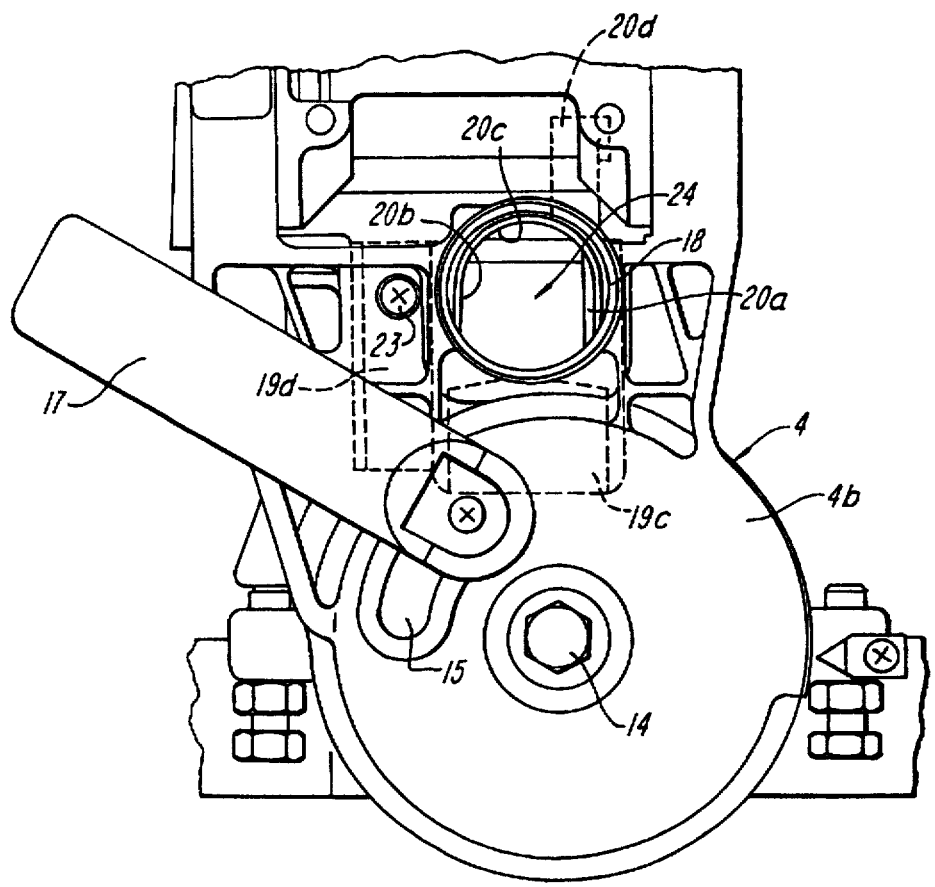
FIG. 2 is a partial rear elevation view of the arm assembly of the desk-top circular saw of the first embodiment.

The arm 4 comprises an attachment member 4a secured to the turntable 3 at its front, an inclinable member 4b so secured to the rear of the attachment member 4a with a bolt 14 as to be pivotal on the bolt 14. As best seen in FIG. 2, above the bolt 14 are an arched slit 15 provided in the inclinable member 4b, a lever 17, and a fastening bolt 16 screwed through one end of the lever 17 and the slit 15 into the attachment member 4a. The inclinable member 4b and the blade saw assembly 6 can be tilted to the right (as seen in FIG. 2) by shifting the lever 17 as much as the fastening bolt 16 is permitted to slide within the slit 15. Also, the inclinable member 4b and the blade saw assembly 6 can be secured at any position within the above limit. This configuration allows the saw blade 8 to perform bevel or angular cuts.

Figure 3:
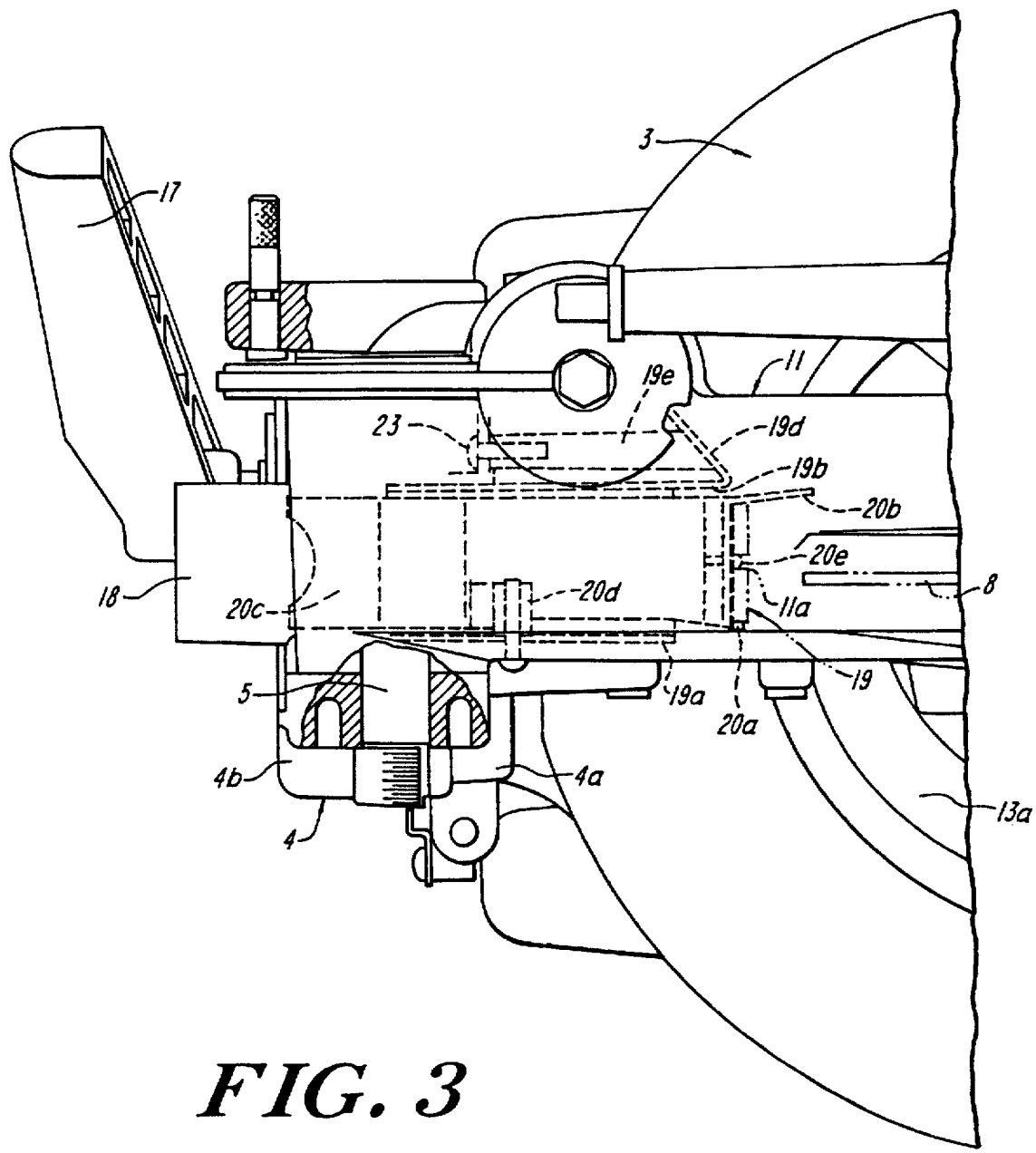
FIG. 3 is a partial top plan view of the arm assembly of the desk-top circular saw of the first embodiment.
Figure 4:
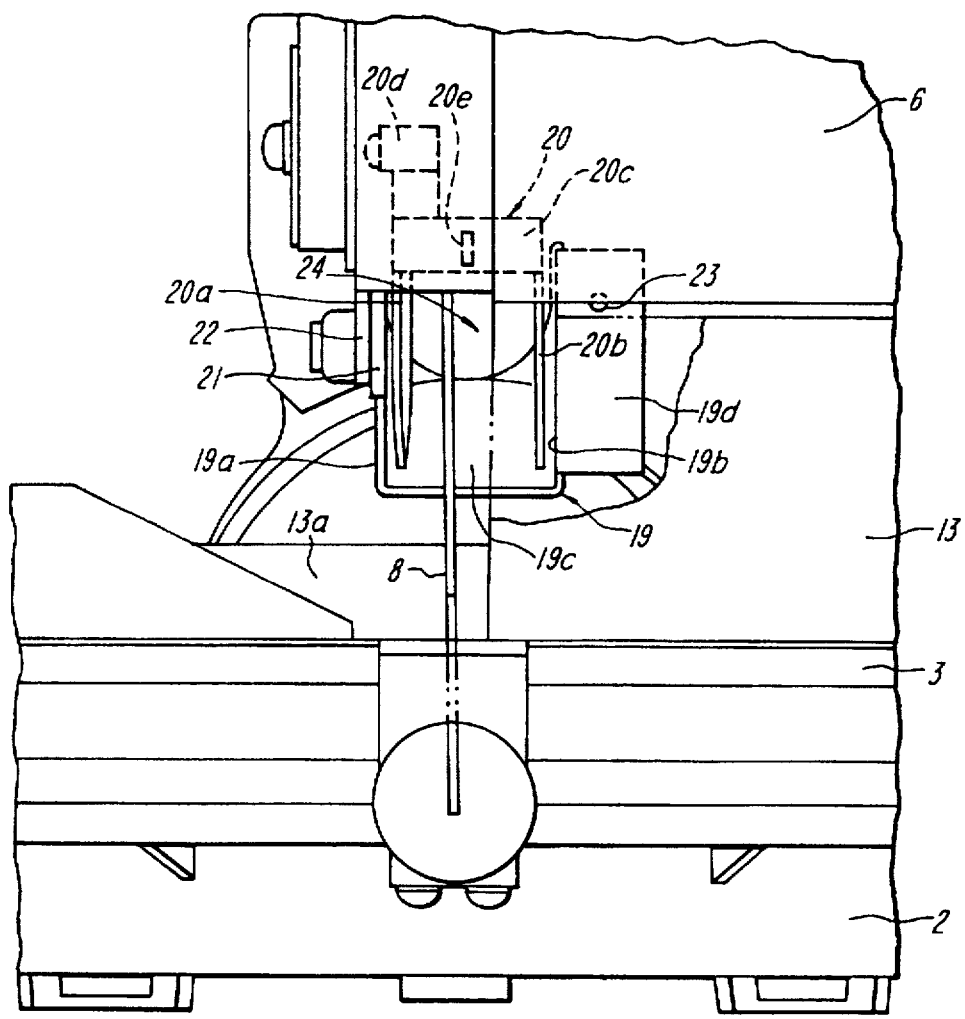
FIG. 4 is a partial elevation view of the desk-top circular saw of the first embodiment in accordance with the present invention.

The inclinable member 4b additionally includes a horizontal cylinder 18 formed integrally therewith between the pivot shaft 5 and the lever 17. The cylinder 18 penetrates the arm 4 to provide for communication between the front face of the arm 4 and the rear face of the arm 4. Provided in the front of the cylinder 18 is a flared member 19 comprising a bottom plate 19c slanted downward having a width approximately the same as the diameter of the cylinder 18, a pair of side plates 19a and 19b attached to its sides to form a U-like cross section. The angle of the bottom plate 19c is set approximately the same as that of the curved portion 13a. As shown in FIG. 3, the flared member 19 is secured to the inclinable member 4b with a screw 23 tightened into a securing portion 19e extending backward from a slant plate 19d provided on the left side plate 19b. The flared member 19 is designed such that when the saw blade assembly 6 is lowered, the saw blade 8 is positioned on a plane generally parallel to and between the right and left side plates 19a and 19b as shown in FIG. 4. The right side plate 19a is so shaped with portions cut away as to accommodate both a link plate 21 linking the arm 4 to the saw blade assembly 6 and an attachment arm 22. The slant plate 19d covers the front of a support (not shown) below the compression spring 12.

Provided under the neck 11 is a chip guide 20 comprising an upper plate 20c, and side plates 20a and 20b provided at the sides of the upper plate 20c to form a U-like cross section. The chip guide 20 is secured to the neck 11 by screwing an attachment piece 20d formed on the right edge of the upper plate 20c to the right side of the neck 11. Also, the chip guide 20 is positioned with a positioning projection 20e fitted into a positioning slit 11a provided in the neck 11. The side plates 20a and 20b are tapered toward their rear ends, and are set apart at such a distance as to fit in between the side plates 19a and 19b of the flared member 19. When the saw blade assembly 6 is in the upper most position urged upward by the compression spring 12 as shown in FIG. 1, the inwardly curved rear end of the upper plate 20c is located slightly above the flared member 19 so as not to obstruct the airflow through the cylinder 18. On the other hand, when the saw blade assembly 6 is brought down to the lower most position against the upward urge of the compression spring 12 as shown in FIGS. 2–4, the upper plate 20c is disposed substantially horizontal also not to obstruct the airflow through the cylinder 18. In either case, the chip guide 20 and the flared member 19 form a horn-like guide passage 24 from its front opening through the cylinder 18. To avoid interference with the work piece when the saw blade assembly 6 is tilted for angular cutting, the right side plates 19a and 20a are made shorter than the left side plates 19b and 20b.

Figure 5A:
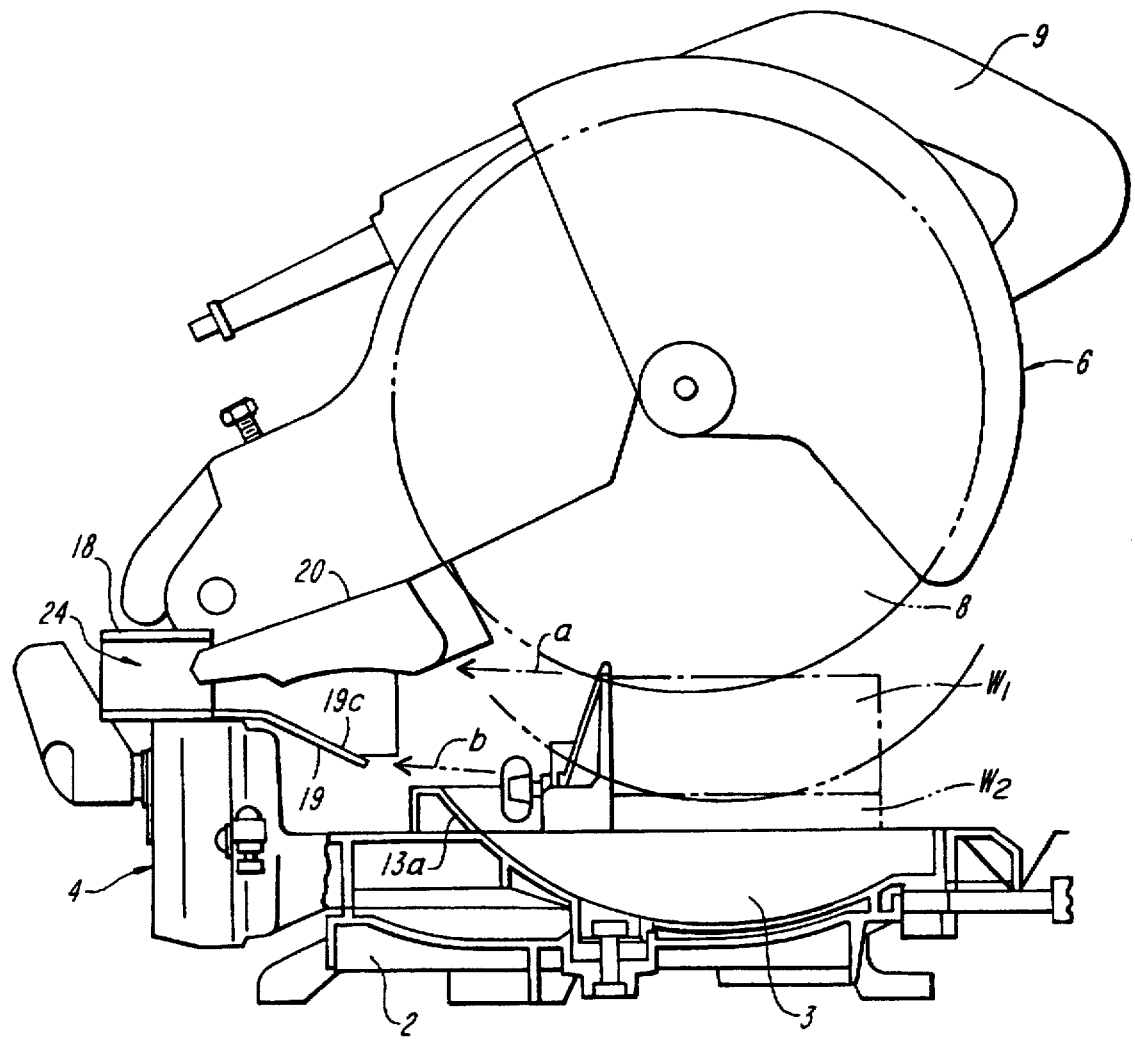
FIG. 5A is a side view of the desk-top circular saw of the first embodiment, showing how chips are collected at the beginning of cutting.

In the operation of the desk-top circular saw 1 thus constructed, the saw blade assembly 6 is lowered with the handle 9 to cut the work piece placed on the turntable 3. As shown in FIG. 5A, most chips are blown substantially horizontally (as indicated by arrows a and b) in the beginning of cutting whether the work is thick (W1) or thin (W2). As a result, chips travel straight into the guide passage 24 and the cylinder 18, or bounce off the inner wall of the flared member 19 or the chip guide 20 into the guide passage 24, then into the cylinder 18. The chips introduced into the guide passage 24 are discharged behind the arm 4 or, if provided, into a dust-bag directly attached to the rear of the cylinder 18 or a dust collector connected to the cylinder 18 via a hose.

Figure 5B:
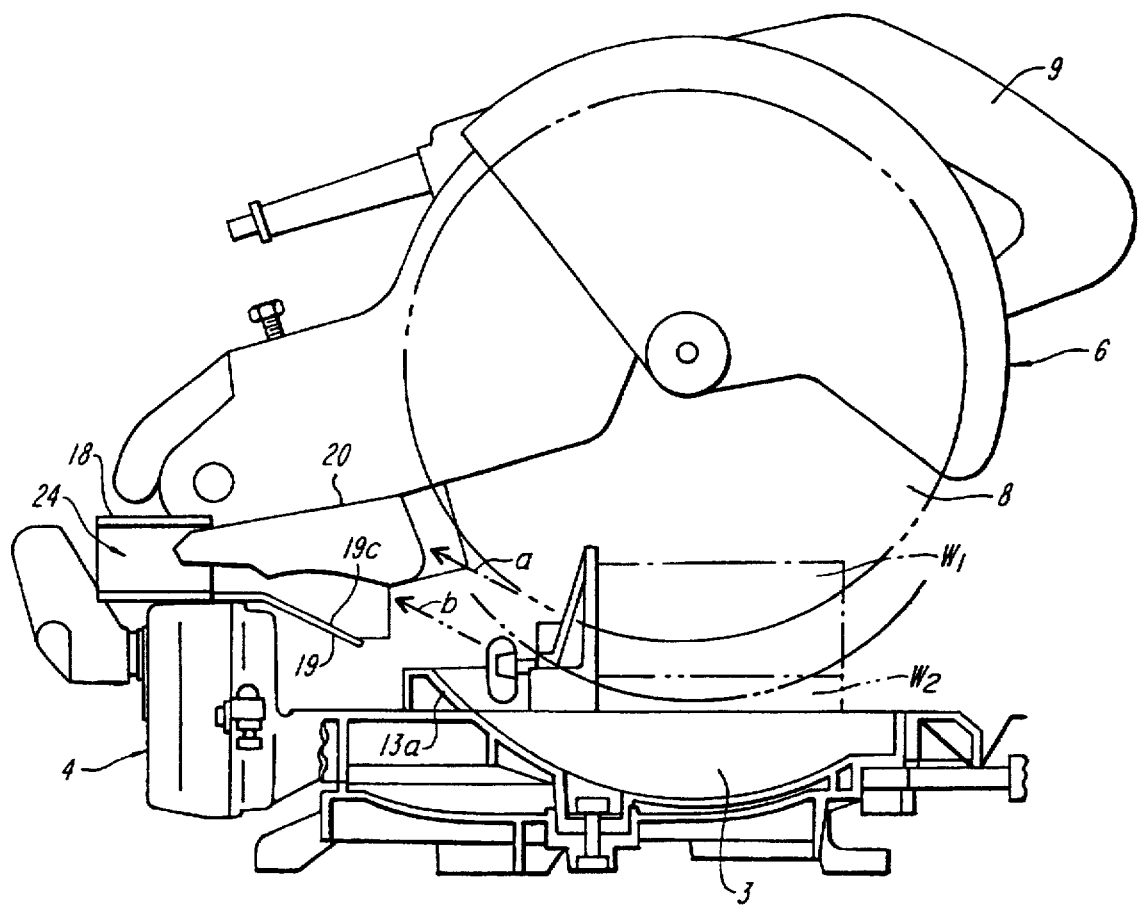
FIG. 5B is a side view of the desk-top circular saw of the first embodiment, showing how chips are collected when the saw blade cuts deep into work.

As shown in FIG. 5B, when the saw blade is cutting deeply into either thick work (W1) or thin work (W2), some chips are blown upward (as indicated by arrows a and b) as well as substantially horizontally as in the above case. However, the chips blown upward are also guided mostly by the chip guide 20 into the cylinder 18 for disposal. Moreover, since the bottom plate 19c of the flared member 19 has similar inclination to the slope of the curved portion 13a, chips are effectively guided into the guide passage 24 without a substantial escape at any stage of cutting.

As described above, work chips are easily and effectively directed with a single chip outlet system provided in association with the arm 4 for their discharge and disposal. Thus, there is no need to provide a separate chip outlet system for the saw blade assembly 6 as in the conventional desk-top circular saw, thus making the structure of the entire apparatus simple. With no separate chip collection and disposal arrangement required, no dust-bag or dust collector needs to be connected to the saw blade assembly 6 either, which tends to affect the workability of the desk-top circular saw.

The flared member 19 or the chip guide 20 does not necessarily have a U-like cross section as in this embodiment; a half-circular cross section or some other shape will also suffice as long as effective chip collection is ensured. The cylinder 18 may have a larger diameter, or may be replaced with a square pipe. Furthermore, the flared member 19 may be formed integrally with the cylinder 18. Alternatively, the chip guide 20 alone, not the flared member 19, may be provided in front of a flared front opening of the cylinder 18. In certain applications, depending on the direction in which chips scatter, the flared member 19, or both the flared member 19 and the chip guide 20, may be omitted, so that the cylinder 18 alone may serve as a chip guide.

Embodiment 2

In the following explanation of a second embodiment, parts identical to these previously described with respect to the first embodiment are denoted by the same reference numbers, so that their description will be dispensed with hereinafter.

Figure 6:
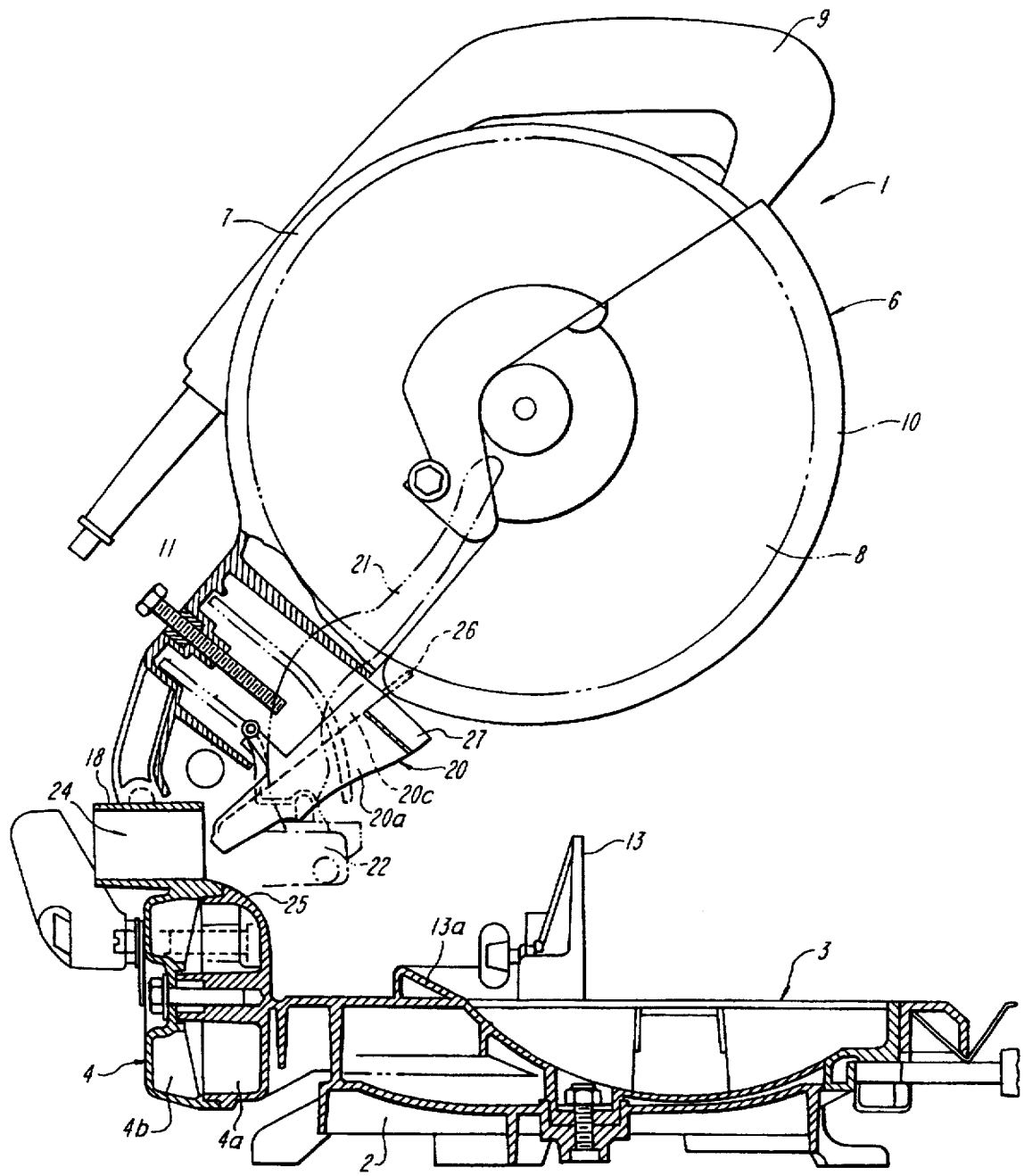
FIG. 6 is a partially cross sectioned side view of a desk-top circular saw of a second embodiment in accordance with the present invention.
Figure 7:
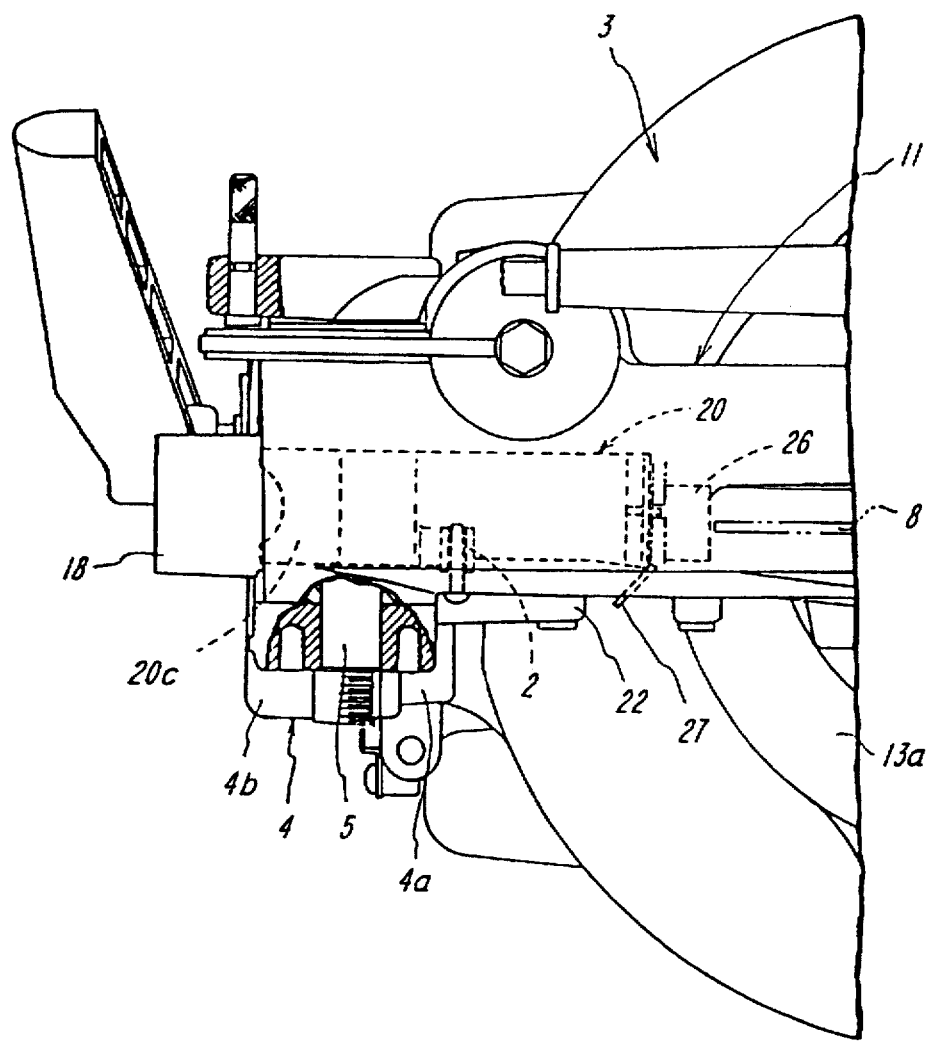
FIG. 7 is a partial top plan view of the arm assembly of the desk-top circular saw of the second embodiment.

Referring to FIG. 6, this embodiment does not include a flared member in front of the cylinder 18, unlike in the first embodiment. Instead, the attachment member 4a of the arm includes at its top end a round surface 25 by which chips are directed into the cylinder 18. Meanwhile, the angle of the curved portion 13a is designed less steep than in the first embodiment so that chips may securely travel into the guide passage 24.

The upper plate 20c of the chip guide 20 is formed increasingly thicker toward the front to set the rebound angle of chips so that the rebounding chips may easily enter the guide passage 24. As an additional chip guiding measure, an extension plate 26 is provided in the front of the upper plate 20c, extending close to the saw blade 8, thereby to direct the chips blown upward by the rotating saw blade 8 toward the upper plate 20c. In this embodiment, the right and left side plates 20a and 20b have the same length, with an angled cover plate 27 formed on the right side plate 20a for covering the front of the attachment arm 22 when the saw blade assembly 6 is lowered. The angled cover plate 27 prevents chip-carrying airflow from being disturbed by the turbulence that would otherwise be caused in front of the side plate 20a by the rotation of the saw blade 8.

In the operation of the desk-top circular saw 1 of the second embodiment, most chips travel substantially horizontally in the beginning of cutting, and are either guided straight into the guide passage 24 and the cylinder 18, or bounce off the round surface 25 into the guide passage 24, then into the cylinder 18. The chips are then discharged behind the arm 4 or, if provided, into a dust-bag directly attached to the rear of the cylinder 18 or a dust collector connected to the cylinder 18 via a hose.

When the saw blade 8 is cutting deeply into work, some chips are blown upward as well as substantially horizontally. However, these chips are also guided into the cylinder 18 mostly by the chip guide 20 for disposal. Chips blown upward are guided all the more effectively into the cylinder 18 because the lower surface the upper plate 20c is more horizontally disposed and because the extension plate 26 is provided in front of the chip guide 20. Effective chip collection is also facilitated at every stage of cutting by optimally setting the angle of the curved portion 13a.

As should be apparent from the above description, work chips are easily and effectively directed with a single chip outlet system provided in association with the arm 4 for their discharge and disposal in this embodiment; there is no need to provide any separate chip outlet system for the saw blade assembly 6, thus making the structure of the entire apparatus simple without sacrificing the chip collecting efficiency. With no separate chip outlet system required for the saw blade assembly 6, no dust-bag or dust collector needs to be connected to the saw blade assembly 6 either, which tends to affect the workability of a saw.

The chip guide 20 does not necessarily have a U-like cross section as in this embodiment; a half-circular cross section or some other shape will also suffice as long as effective chip collection is ensured. Also, the extension plate 26 may be provided with reinforcing ribs thereon or made longer with a center slit between which the saw blade 8 is located.

Though in the above embodiments, the cylinder 18 is formed straight penetrating the arm 4, it may be bent perpendicularly downward behind the arm 4 in order that chips introduced therein can be collected immediately behind the arm 4 instead of scattering widely behind the circular saw.

While the present invention has been described and illustrated specifically with reference to the above preferred embodiments, it is to be understood that the present invention can be practiced in various changes an modifications without departing from the scope or spirit of essential characteristics thereof.

What is claimed is:

1. A desk-top circular saw comprising a saw blade assembly having a neck, a base having a front end and a rear end and defining an axis, an arm extending from said rear end of said base, said arm having a top end distal from said base and a front face and a rear face, said neck of said saw blade assembly being pivotably mounted to said top end of said arm such that said saw blade assembly is vertically pivotable about a pivot axis, and chip discharge means for removing chips from said saw, said chip discharge means including means defining an opening in said arm, said opening providing communication between said front face of said arm and said rear face of said arm, and a chip guide mounted to said neck and being pivotable with said neck about said pivot axis, said saw generating chips during operation, said chip guide having a surface designed to deflect said chips into said opening.

2. The saw according to claim 1, wherein said chip guide has a U-shaped cross-section.

3. The saw according to claim 2, wherein said chip guide further comprises an upper plate and two side plates, each of said side plates extending perpendicularly from opposite ends of said upper plate to form said U-shaped cross-section.

4. The saw according to claim 1, wherein said opening comprises a cylinder having an axis parallel to said axis of said base.

5. The saw according to claim 1, wherein said chip discharging means further comprises a flared member connected to said arm and extending from said opening such that chips generated during operation of said saw are guided into said opening by said flared member.

6. The saw according to claim 5, wherein said flared member comprises a bottom plate which extends at a decline from said opening in a direction toward said base, said decline having a slope.

7. The saw according to claim 6, further comprising a guide plate extending from said base, said guide plate including an inclined portion having a slope and extending in a direction toward said opening, said slope of said inclined portion being substantially equal to said slope of said bottom plate of said flared member.

8. The saw according to claim 5, wherein said flared member has a U-shaped cross-section.

9. The saw according to claim 8, wherein said flared member comprises a bottom plate and two side plates, each of said side plates extending perpendicularly from opposite ends of said bottom plate to form said U-shaped cross-section.

10. The saw according to claim 1, wherein said chip discharge means further comprises a rounded surface integrally formed on said front face of said arm at said opening.

11. The saw according to claim 1, wherein said chip guide includes an upper plate having a thickness and a front end distal to said opening, said thickness of said upper plate increasing toward said front end of said upper plate.

12. The saw according to claim 11, further comprising an extension plate attached to said front end of said upper plate of said chip guide.

13. The saw according to claim 1, wherein said chip guide comprises an upper plate having a front end distal to said opening, and an extension plate attached to said front end of said upper plate of said chip guide.

* * * * *